United States Patent [19]

Lindlar et al.

[11] 3,715,404

[45] Feb. 6, 1973

[54] PROCESS FOR SELECTIVE HYDROGENATION

[75] Inventors: Herbert Lindlar, Reinach; Robert Dubuis, Morges, both of Switzerland

[73] Assignee: Hoffmann-La Roche, Inc., Nutley, N.J.

[22] Filed: Sept. 19, 1968

[21] Appl. No.: 760,980

Related U.S. Application Data

[63] Continuation-in-part of Ser. No. 380,038, July 2, 1964, abandoned.

[30] Foreign Application Priority Data

June 3, 1964 Switzerland.....................7260/64

[52] U.S. Cl.............260/642, 252/430, 260/526 N, 260/598, 260/617 C, 260/624 B, 260/631.5, 260/635 M, 260/666 A, 260/668 R, 260/677 H, 260/690

[51] Int. Cl.....C07c 33/02, C07c 35/02, C07c 57/02

[58] Field of Search..260/642, 635 M, 617 C, 618 H, 260/690, 677 H, 666 A, 668 R, 526 N, 624 B, 631.5; 252/428, 430, 439

[56] References Cited

UNITED STATES PATENTS

| | | |
|---|---|---|
| 2,300,598 | 11/1942 | Schnabel et al.................260/635 M |
| 2,681,938 | 6/1954 | Lindlar..........................260/677 H |
| 2,992,278 | 7/1961 | Tedeschi.......................260/635 M |
| 3,075,024 | 1/1963 | Frevel et al....................260/677 H |
| 3,336,239 | 8/1967 | Bailey et al....................260/617 C |
| 3,450,776 | 6/1969 | Di Cio et al...................260/642 |

FOREIGN PATENTS OR APPLICATIONS 288,271  10/1915  Germany............................260/642

OTHER PUBLICATIONS

Taylor et al., "J. Am. Chem. Soc.", Vol. 63, (1941), pp. 2756, 2757, Q01A5.

*Primary Examiner*—Leon Zitver
*Assistant Examiner*—Joseph E. Evans
*Attorney*—Samuel L. Welt, Jon S. Saxe, Bernard S. Leon and William H. Epstein

[57] ABSTRACT

A process for selective hydrogenation of unsaturated organic compounds having at least four carbon atoms by carrying out said hydrogenation in a liquid phase in the presence of an organic sulfur compound utilizing a partially deactivated palladium catalyst.

8 Claims, No Drawings

PROCESS FOR SELECTIVE HYDROGENATION

CROSS-REFERENCE TO RELATED APPLICATIONS

This application is a continuation-in-part of U.S. patent application Ser. No. 380,038, filed July 2, 1964, Lindlar et al and now abandoned.

BACKGROUND OF THE INVENTION

It is well known in the art that certain unsaturated organic compounds, for example, compounds having triple bonds in their structure or quinones having a double-bond-containing side chain, can be hydrogenated, selectively, by means of the use of special hydrogenation catalysts. Palladium catalysts are especially valuable for use in such selective hydrogenations, it being well known that the activity of palladium can be reduced, and its selectivity thus enhanced, by its use in combination with a second metal, such as lead, bismuth, copper, zinc, tin, mercury, cadmium or thorium. One such partially deactivated palladium catalyst is the palladium-lead catalyst described, for example, in Helv. Chim. Acta. 35, 446 (1952). Moreover, it is also known in the art that the selectivity of such catalysts can be improved when an organic nitrogen base, for example, a tertiary amine, such as, pyridine or quinoline, is added to the hydrogenation mixture.

BRIEF SUMMARY OF THE INVENTION

In accordance with this invention, it has been found that acetylenically unsaturated organic compounds having about four carbon atoms, aryl-containing compounds having at least one keto group attached directly to the aryl moiety and having an ethylenically unsaturated side chain can be selectively hydrogenated without effecting any ethylenic unsaturation by carrying out the hydrogenation in a liquid state utilizing a partially deactivated palladium hydrogenation catalyst in the presence of an organic sulfur compound or a mixture of organic sulfur compounds, derived from hydrogen sulfide or hydrogen disulfide. The use of the organic sulfur compounds in accordance with this invention considerably improves the selectivity of partially deactivated hydrogenation catalysts, such as palladium lead catalysts and, accordingly, increases the yields of the derived partially hydrogenated product.

DETAILED DESCRIPTION

The organic sulfur compounds which are used in the practice of this invention are those having the formula

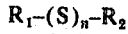

in which formula, the symbol $n$ represents the integer 1 or 2; $R_1$ and $R_2$, being the same or different, each representing an organic residue, which is aliphatic or aromatic in nature, which is bound to the sulfur through a carbon atom of said residue.

Thus, for example, the symbols $R_1$ and $R_2$ in Formula I each represent a saturated, straight chain, branched chain or cyclic aliphatic hydrocarbon. Such hydrocarbon can be unsubstituted or substituted, for example, with an oxygen-, sulfur- or a nitrogen-containing group, such as, a hydroxy, alkoxy, carboxy, carbalkoxy, oxo, thio, alkylthio, imino, amino, alkylamino, dialkylamino, etc. group. The chain of the hydrocarbon residue can also contain a hetero atom, such as, oxygen, sulfur or nitrogen. Additionally, the symbols $R_1$ and $R_2$ each represent aryl groups, such as, phenyl or napthyl which, if desired, can be substituted with, for example, an alkyl group and/or the previously named oxygen-, sulfur- and nitrogen-containing substituents. Furthermore, the symbols $R_1$ and $R_2$ each represent heterocyclic groups, such as, pyridine and quinoline groups. Finally, the symbols $R_1$ and $R_2$ each represent araliphatic groups, especially a benzyl radical.

Where, in Formula I, the symbol $n$ represents the integer 1, the symbol $R_2$ represents also a hydrogen atom. Additionally, groups represented by the symbols $R_1$ and $R_2$ may form, with a sulfur atom, a heterocyclic group, such as, thiophene. The number of members constituting such ring is variable, for example, from 3 to 6.

Thus, for example, Formula I which has been set forth heretofore embraces within its scope the following groups of compounds:

a. Thiols, such as, thioalcohols, mercaptans, thiophenols, etc. having the formula

in which the symbol $R_1$ has the same meaning as in Formula I.

b. Thioethers of the formula

in which the symbols $R_1$ and $R_2$ have the same meanings as in Formula I.

c. Organic disulfides of the formula

in which the symbols $R_1$ and $R_2$ have the same meanings as in Formula I.

Included among the thiols which are represented by Formula I$a$ are alkylmercaptans, such as, n-butylmercaptan, n-hexylmercaptan, etc.; monothioglycols, such as, monothioethyleneglycol, etc.; dithioglycols, such as, dithiopropyleneglycol, etc.; arylmercaptans (thiophenols), such as, thiophenol itself and its nuclear substitution products, such as, thiocresol, etc.; dithiobenzols, such as, dithioresorcin, etc.; mercapto-substituted heterocyclics, such as, mercaptopyridine, mercaptopyrimidine, etc.

As examples of the thioethers, which are encompassed by Formula I$b$, there can be mentioned dialkyl sulfides, such as di-n-butyl sulfide, di-tertiary butyl sulfide, etc.; dihydroxyalkyl sulfides, such as, thiodiethyleneglycol [S(CH$_2$CH$_2$OH)$_2$], thiodipropyleneglycol, etc.; diaryl sulfides, such as, diphenyl sulfide, etc.; diaralkyl sulfides, such as, dibenzyl sulfide, etc.; alkyl ethers of thiophenols, such as, thioanisole, etc.; cyclic thioethers, and substituted derivatives thereof, such as, ethylene sulfide, thiophene, thiazole, thiopyran, thioxanthone, thioxanthydrol, 1,4-thioxane, etc.; S-alkyl ethers of mercapto-substituted heterocyclics, such as, 2-methyl-thio-4,6-diamino pyrimidine, etc.

A class of compounds which is especially well suited for use in the practice of this invention is that, containing at least two thioether groups in the molecule, having the following formula:

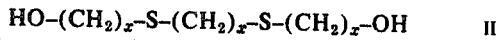

in which $x$ represents an integer from 1 to 6, inclusive.

Especially well suited for use is the compound of Formula II in which the symbol $x$ represents the integer 2, that is, 1,2-bis-(2-hydroxyethylthio)-ethane having the formula $$HO-(CH_2)_2-S-(CH_2)_2-S-(CH_2)_2-OH$$

The compounds of Formula II are obtained by the reaction of one mole of α-ω-dihalogenoalkane with 2 moles of a mono-thio alkyleneglycol.

Illustrative of the organic disulfide compounds which are represented by Formula Ic are dialkyl disulfides, such as, di-n-butyl disulfide; diaryl disulfides, such as, diphenyl disulfide, di-(o-carboxyphenyl)-disulfide, etc.; diaralkyl disulfides, such as, dibenzyl disulfide. Moreover, since it is known that organic disulfide compounds are converted, easily, by reductive cleavage into the corresponding thiols and since such thiols can, in turn, be reconverted into disulfides by the action of mild oxidation agents, according to the reaction mechanism shown in the following equation $$R_1-SH = R_1-S-S-R_1$$

it will be understood that all of the disulfides, corresponding to the thiols specifically mentioned heretofore, can be used in the practice of this invention.

The present invention is of significant value in many and various processes. The use of the organic sulfur compounds is found to be most efficient and beneficial in the selective hydrogenation of organic compounds which contain acetylenic unsaturation. Any liquid or solid organic compound having at least four carbon atoms and containing acetylenic unsaturation can be partially hydrogenated to reduce the triple bond to a double bond in accordance with this invention. Among the acetylenic unsaturated compounds which can be utilized in accordance with this invention are included aliphatic hydrocarbons containing from four to 45 carbon atoms and having one or more triple bonds such as mono-alkyl acetylenes, dialkyl acetylenes, etc., and aliphatic hydrocarbons containing four to 45 carbon atoms having one or more triple bonds and one or more conjugated or non-conjugated double bonds. Also included among the acetylenically unsaturated compounds which can be selectively hydrogenated in accordance with this invention are aryl or cycloalkyl compounds containing an acetylenically unsaturated aliphatic side chain. The aryl moiety can be phenyl, napthyl, etc. Both the aryl and cycloalkyl moieties can be substituted with one or more aliphatic side chains. Generally this aryl or cycloalkyl compound can contain from eight to 45 carbon atoms. Among the aryl or cycloalkyl compounds containing acetylenic unsaturation which can be treated in accordance with this invention are included those compounds having a side chain which contains in addition to the triple bond, conjugated or non-conjugated double bonds such as 15,15'-dehydro-carotene etc. Among the organic compounds containing acetylenic unsaturation which can be utilized in accordance with this invention are included aliphatic alcohols, i.e., hydroxy substituted aliphatic hydrocarbons, containing from four to 45 carbon atoms which include primary propargyl alcohols such as 1-butyne-4-ol, 3-methyl-1-butyne-4-ol, 4-penten-1-yne-5-ol; secondary propargyl alcohols such as 1-butyne-3-ol, 4-penten-1-yne-3-ol, 7-methyl-6-octen-1-yne-3-ol; and tertiary propargyl alcohols such as 3-methyl-1-butyne-3-ol, 3-methyl-4-penten-1-yne-3-ol, 3,7-dimethyl-6-octen-1-yne-3-ol, that is, dehydrolinalool, 3,7,11,15-tetramethyl-1-hexadecyne-3-ol, that is, dehydroisophytol, 3-methyl-1-pentyne-3,5-diol, etc.

Other organic compounds which can be selectively hydrogenated in accordance with this invention are cycloalkyl compounds containing hydroxy substituted aliphatic side chains, wherein the side chain has one or more triple bonds and can contain conjugated or non-conjugated double bonds in addition to the triple bond. An example of such a compound is 3,7-dimethyl-9-[2-6,6'-trimethylcyclohexene-(1')-yl]-2,7-nonadiene-4yne-1,6-diol. Also included among the organic compounds containing acetylenic unsaturation which can be utilized in accordance with this invention are aliphatic acids, i.e., carboxy substituted aliphatic hydrocarbons, having from four to 45 carbon atoms containing one or more triple bonds and which can contain conjugated or non-conjugated double bonds in addition to the triple bond. As examples of such acids are the acetylenic precursors of arachidonic acid, linoleic acid, γ-linolenic acid and other essential fatty acids.

The process of this invention can also be utilized to convert a keto group attached to an aryl moiety to a hydroxy group. In accordance with this invention the aryl compound which contains a keto group can contain aliphatic side chains which may have at least one triple bond as well as one or more conjugated or non-conjugated double bonds. The reaction of this invention converts the keto group to a hydroxy group without effecting the double bonds within the compound. For example, the quinone Vitamin $K_1$ can be converted into the corresponding hydroquinone compound in which the ethylenic bonds in the side chain are preserved. Generally, these aryl compounds contain from six to 45 carbon atoms.

The hydrogenation reaction of this invention is carried out in a liquid medium. If the acetylenically unsaturated organic compound and the aryl keto compound is a liquid, then no solvent need be present. On the other hand, if the acetylenically unsaturated organic or aryl keto compound is a solid, then the reaction of this invention should take place in the presence of an inert organic solvent. Even in the case of where these compounds are liquids, an inert organic solvent can, if desired, be present in the reaction medium.

The manner in which the present invention is carried out will be readily apparent to persons skilled in the art. In general, partial hydrogenation processes utilizing the organic sulfur compounds disclosed herein are carried out in the same manner as the known prior art processes. Thus, for example, the hydrogenations can be effected in the presence or in the absence of a solvent. Moreover, the hydrogenation reactions can be carried out at room temperature, or at a temperature somewhat above or below room temperature, and at atmospheric, or a higher pressure. Ordinarily, the reaction mixture is stirred or agitated during the hydrogenation reaction.

As a general rule, any suitable solvent can be employed in the hydrogenation procedure. Thus, for example, one can use as the solvent aliphatic and aromatic hydrocarbons, such as, petroleum other, paraffin oils, cyclohexane, benzene, toluene, etc.; halogenated hydrocarbons, such as, methylene chloride, chloroform, chlorobenzene, etc.; alcohols, such as, methanol, ethanol, isopropanol, etc.; esters, such as, ethyl acetate; ethers, such as, dimethyl ether, tetrahydrofuran, etc.; ketones, such as, acetone. Furthermore, where a water-soluble starting material is to be used, water, or a water-containing solvent, can be employed.

Furthermore, the partial hydrogenation can be carried out using, in addition to the organic sulfur compounds disclosed herein, deactivating agents already known in the prior art, such as, tertiary amines. Pyridine and quinoline are representative of the tertiary amine deactivating agents which can be employed.

The preferred hydrogenation catalyst which is used in the practice of this invention, is that described in Helv. Chim. Acta. 35, 446 (1952) in which palladium supported on calcium carbonate as a carrier, is partially deactivated by the addition of lead. Such a catalyst is described also in U.S. Pat. No. 2,681,938. For convenience, this preferred catalyst will be referred to in the specification and in the claims simply as a palladium-lead catalyst. As the carrier material for these catalysts there can be used in place of the preferred calcium carbonate, barium carbonate, barium sulfate, clay, calcium sulfate, magnesium oxide or charcoal. In the alternative, the catalyst can also be employed without a carrier material.

The quantity of sulfur compound which is used in the practice of this invention is variable within rather wide limits. The optimum amount of the organic sulfur compound which is to be used in any particular instance can be determined readily by preliminary experiment. In general, however, there will be employed at least about 0.1 percent by weight of sulfur compound, based on the weight of the hydrogenation catalyst. Quantities of sulfur compound, slightly or greatly in excess of 0.1 percent by weight, based on the weight of the catalyst, can, however, be used, if desired. In the preferred embodiment of the invention, wherein 1,2-bis-(2-hydroxyethylthio)-ethane is the sulfur compound employed and a palladium-lead catalyst is used, generally, there will be used from about 0.1 percent to about 2.0 percent by weight of the sulfur compound based upon the weight of the catalyst employed.

Under normal circumstances, there will be incorporated into the reaction mixture only one of the previously identified organic sulfur compounds. If desired, however, a mixture of two or more different organic sulfur compounds can be used to effect the hydrogenation batch.

It has been found that, as a general rule, the sulfur compound, or compounds, which is used in the various hydrogenation reactions can be recovered and that such compound or compounds can be used in subsequent batches without any preceptible loss of, or reduction in, its activity. Thus, for example, where a particular hydrogenation process has been carried out in the absence of a solvent, and after the partially hydrogenated product has been removed, the residue, containing the organic sulfur compound, is recovered and added, as is, to the new starting material together with the hydrogenation catalyst.

For a fuller understanding of the nature and objects of this invention, reference may be had to the following examples which are given merely as further illustration of the invention and are not to be construed in a limiting sense.

EXAMPLE 1

In this example, 500 grams of 3-methyl-1-butyne-3-ol were diluted with 100 ml. of a low viscosity paraffin oil (boiling range 60°–90° C. at 12 mm.). To the solution, thus obtained, there was added 10.0 grams of the palladium-lead catalyst and 2.0 grams of dibenzyl sulfide. After the theoretical quantity of hydrogen (about 147 liters) had been taken up, the reaction proceeded further, but only at a very slow rate. The hydrogenation was discontinued at this point and the catalyst was removed by filtration. The 3-methyl-1-buten-3-ol boiling point at 50°–55° C. at 70 mm. was separated from the solvent by distillation. The compound was obtained in a yield of about 98 percent of theory and, by gas chromatographic methods, determined to be 99 percent pure.

The dibenzyl sulfide which remained in the paraffin oil residue was, without refinement, suitable for use in subsequent hydrogenation operations. So used, for example, after repeating the hydrogenation process described in this example three times, the reaction was effected with the same selectivity and the same rapidity as was noted the first time the catalyst was used.

Outstanding selectivity was observed in the above described partial hydrogenation process when methylbutynol was converted to a methyl butenol using the palladium-lead catalyst and the following named organic sulfur compounds:

| Organic Sulfur Compounds | Quantities in Percentages based on the weight of the Catalyst |
|---|---|
| Di-n-butylsulfide | 3% – 50% |
| Ditertiary butylsulfide | 5% |
| Mercaptopyridine | 0.2% |
| Thiophenol | 0.3% – 3% |
| D,l-methionine | 5% – 10% |
| Methylisothiourea sulfate | 100% |
| 2-Methylmercapto-4,6-diaminopyrimidine | 0.3% – 20% |
| Phenothiazine | 2% – 10% |
| Phenothiazine-N-acetic acid ester | 50% – 100% |
| Thioanisole | 60% |
| Thiodiethyleneglycol | 50% |
| Thiophene | 0.3% – 3% |
| 1,4-Thioxane | 5% – 50% |
| Thioxanthone | 250% |
| Thioxanthydrol | 250% |
| Di-(o-carboxyphenyl)-disulfide | 0.2% – 3% |

EXAMPLE 2

In this example, 1000 grams of 3-methyl-1-butyne-3-ol were hydrogenated in the presence of 50 grams of palladium-lead catalyst and 14 grams of thiodiethylene glycol, i.e., S(CH$_2$CH$_2$OH)$_2$, at a temperature of 20° to 22° C. and under a water pressure of 10 cm. After the theoretical quantity of hydrogen had been taken up, further absorption of hydrogen was practically nil. The hydrogenation reaction was discontinued at this point, the catalyst was removed by filtration and the filtrate was subjected to distillation. There was, thus obtained, about 1,000 grams of 3-methyl-1-buten-3-ol of about 99 percent purity. The compound had a boiling point of 94° to 96° C. at 742 mm. The residue consisted essentially of the starting thiodiethyleneglycol, boiling point at 168° C. at 14 mm.

The sulfur compound which remained in the residue was, without distillation, used in the hydrogenation of subsequent batches.

EXAMPLE 3

384 Grams of 3-methyl-4-penten-1-yn-3-ol, dissolved in 650 ml. of methylene chloride, was hydrogenated in the presence of 10 ml. of triethylamine, 20 grams of palladium-lead catalyst and 0.4 grams of 1,2-bis-(2-hydroxyethylthio)-ethane at a temperature of 20° C., with vigorous stirring. After the absorption of 1 mole of hydrogen, further absorption of hydrogen ceased. The theoretical takeup was 98 liters of hydrogen, 20°/729 Torr. Subsequently, the solution was filtered to remove the catalyst therefrom, following which the methylene chloride solvent was separated, from the thus obtained 3-methyl-1,4-pentadiene-3-ol, by distillation.

EXAMPLE 4

685 Grams of 3-methyl-1-pentyne-3,5-diol, dissolved in 600 ml. of methylene chloride, was hydrogenated in the presence of 3 ml. of triethylamine, 30 grams of palladium-lead catalyst and 0.15 gram of 1,2-bis-(2-hydroxyethylthio)-ethane, under the conditions described in Example 3, to form 3-methyl-1-penten-3,5-diol. The quantity of hydrogen absorbed during the reaction corresponded to the quantity theoretically required, namely, 153 liters of hydrogen at 20°/737 Torr.

EXAMPLE 5

500 Grams of 3,7-dimethyl-6-octen-1-yn-3-ol was hydrogenated in the presence of 25 grams of palladium-lead catalyst and 2.5 grams of thiodiethylene glycol at a temperature within the range of from about 20° C. to about 23° C. and a water pressure of 10 cm. The reaction was attended with continuous stirring. After a period of about 8 hours, the takeup of hydrogen had, for all practical purposes, ceased. The hydrogen reaction was discontinued, the catalyst was removed by filtration and the, thus obtained, linalool, that is 3,7-dimethyl-1,6-octadien-3-ol was agitated for a period of about 1 hour with 100 ml. of water. Thereafter, the water was removed and the linalool was dried over sodium sulfate.

EXAMPLE 6

In this example, 11.1 grams of 15,15'-dehydro-β-8'-carotinal was introduced, with 3.0 grams of palladium-lead catalyst, in an atmosphere of carbon dioxide gas, into a shaking vessel. To this mixture there was added 0.2 ml. of triethylamine and 3.0 mg. of 1,2-bis-(2-hydroxyethylthio)-ethane dissolved in 3 ml. of ethanol. The mixture, thus obtained, was diluted with 100 liters of methanol. Hydrogenation of the unsaturated compound was then effected at a temperature of 20° C. After about 8 hours, there had been absorbed the quantity of hydrogen theoretically required and, subsequently, little additional hydrogen was taken up. The hydrogenation reaction was, therefore, discontinued.

The partially crystalline 15,15'-all-trans-β-apo-8'-carotinal was brought into solution by the addition of approximately 50 ml. of methylene chloride to the reaction mixture. The catalyst was removed by filtration and the filtrate subsequently was evaporated almost to dryness. The residue was brought into solution using 80 ml. of petroleum ether and approximately 20 ml. of ethylene chloride. Thereafter, the solution was concentrated to a volume of about 60 ml. By this procedure, crystallization of the 15,15'-all-trans-β-apo-8'-carotinal was accomplished slowly. The compound, melting at 138° C., was obtained in a yield of 9.6 grams, or 86.5 percent of theory; purity of 99.7 percent (U.V.).

EXAMPLE 7

200 Grams of dehydroisophytol was mixed with 600 ml. of methylene chloride, 10 grams of sodium carbonate, 10 grams of palladium-lead catalyst and 0.1 gram of 1,2-bis-(2-hydroxy-ethylthio)-ethane. Hydrogenation of the dehydroisophytol was, thereafter, accomplished at a temperature of 20° C. with vigorous stirring. After a period of about 5 hours, absorption of hydrogen had ceased. The solution was then filtered and the methylene chloride removed by vacuum distillation. There was, thus obtained, 202 grams of crude isophytol. The crude product did not contain any of the dehydroisophytol starting material or any traces of products resulting from excessive hydrogenation.

EXAMPLE 8

In this example, 600 grams of 3,7-dimethyl-9-(2'6,6'-trimethylcyclohexen-(1')-yl)-2,7-nonadiene-4-yne-1,6-diol, in 900 ml. of methylene chloride, was hydrogenated in the presence of a mixture of 50 grams of palladium-lead catalyst, 0.36 gram of 1,2-bis-(2-hydroxyethylthio)-ethane, 0.6 gram of thioethyleneglycol and 14.4 ml. of dimethyl ethanolamine at a temperature of 20° C. At the end of about 7½ hours, absorption of 44 liters of the hydrogen had taken place and further absorption had ceased. The catalyst was then removed by filtration and washed with methylene chloride. After removal of the methylene chloride by vacuum distillation and after crystallization from petroleum ether, there was obtained 3,7-dimethyl-9-[2',6',6'-trimethylcyclohexen-(1')-yl]-2,4,7-nonatriene-1,6-diol, in a yield of at least about 94 percent of theory.

We claim:

1. A process for the hydrogenation of organic compounds selected from the group consisting of aliphatic hydrocarbons containing from four to 45 carbon atoms and having one or more triple bonds, aryl and cycloalkyl hydrocarbons containing from eight to 45 carbon atoms and having an aliphatic side chain with one or more triple bonds, hydroxy substituted aliphatic hydrocarbons containing from four to 45 carbon atoms and one or more triple bonds, cycloalkyl hydrocarbons containing from eight to 45 carbon atoms having a hydroxy substituted aliphatic side chain with one or more triple bonds, carboxy substituted aliphatic hydrocarbons containing from four to 45 carbon atoms and having one or more triple bonds and aryl containing hydrocarbons containing six to 45 carbon atoms and at least one keto group directly attached to the aryl moiety comprising hydrogenating said organic compound in a liquid medium in the presence of a palladium catalyst partially deactivated with lead, bismuth, copper, zinc, tin mercury, cadmium or thorium; and a sulfur derivative of the formula:

wherein $x$ is an integer of from 1 to 6 inclusive.

2. The process of claim 1 wherein said palladium catalyst is partially deactivated with lead.

3. The process of claim 1 wherein at least 0.1 percent by weight of said sulfur derivative, based on the weight of said catalyst, is used.

4. The process of claim 1 wherein said sulfur derivative is 1,2-bis-(2-hydroxyethylthio)-ethane.

5. The process of claim 1 wherein said organic compound is a hydroxy substituted hydrocarbon.

6. The process of claim 5 wherein said organic compound is 3-methyl-butyn-(1)-ol-(3).

7. The process of claim 5 wherein said palladium catalyst is partially deactivated with lead.

8. The process of claim 5 wherein said sulfur derivative is 1,2-bis-(2-hydroxyethylthio)-ethane.

* * * * *